United States Patent [19]

Miyakawa

[11] Patent Number: 5,141,766
[45] Date of Patent: Aug. 25, 1992

[54] SURIMI

[75] Inventor: Masaya Miyakawa, Tokyo, Japan

[73] Assignee: Miyakawa Company Ltd., Tokyo, Japan

[21] Appl. No.: 852,341

[22] Filed: Mar. 17, 1992

Related U.S. Application Data

[63] Continuation of Ser. No. 686,943, Apr. 18, 1991, abandoned.

[30] Foreign Application Priority Data

Sep. 26, 1990 [JP] Japan .................................. 2-256628

[51] Int. Cl.⁵ .............................................. A23L 1/325
[52] U.S. Cl. .................................................... 426/643
[58] Field of Search ......................................... 426/643

[56] References Cited

U.S. PATENT DOCUMENTS

| 2,411,736 | 11/1946 | Kleinschmidt | 426/643 |
| 4,411,917 | 10/1983 | Chang | 426/643 X |
| 4,910,039 | 3/1990 | Fujita et al. | 426/643 X |

FOREIGN PATENT DOCUMENTS

| 59-125870 | 7/1984 | Japan | 426/643 |
| 60-180563 | 9/1985 | Japan | 426/643 |

Primary Examiner—Arthur L. Corbin
Attorney, Agent, or Firm—Wenderoth, Lind & Ponack

[57] ABSTRACT

An improved surimi or fish paste product is produced by using the meat of freshwater fish, in particular catfish, as a chief starting material instead of a conventionally used saltwater fish, such as walleye pollack. The surimi produced from catfish has a gel-strength and whiteness comparable to that produced from walleye pollack.

2 Claims, 2 Drawing Sheets

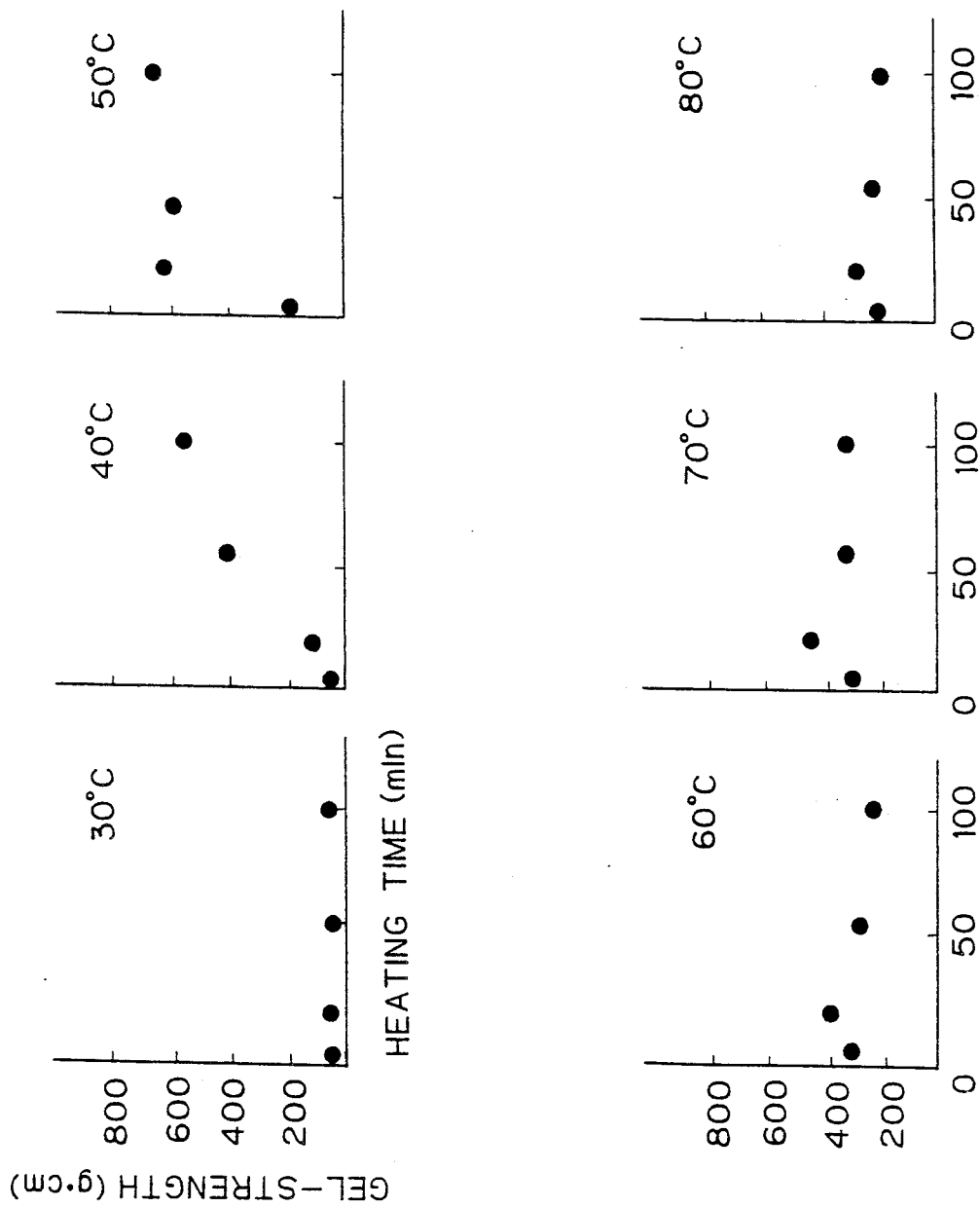

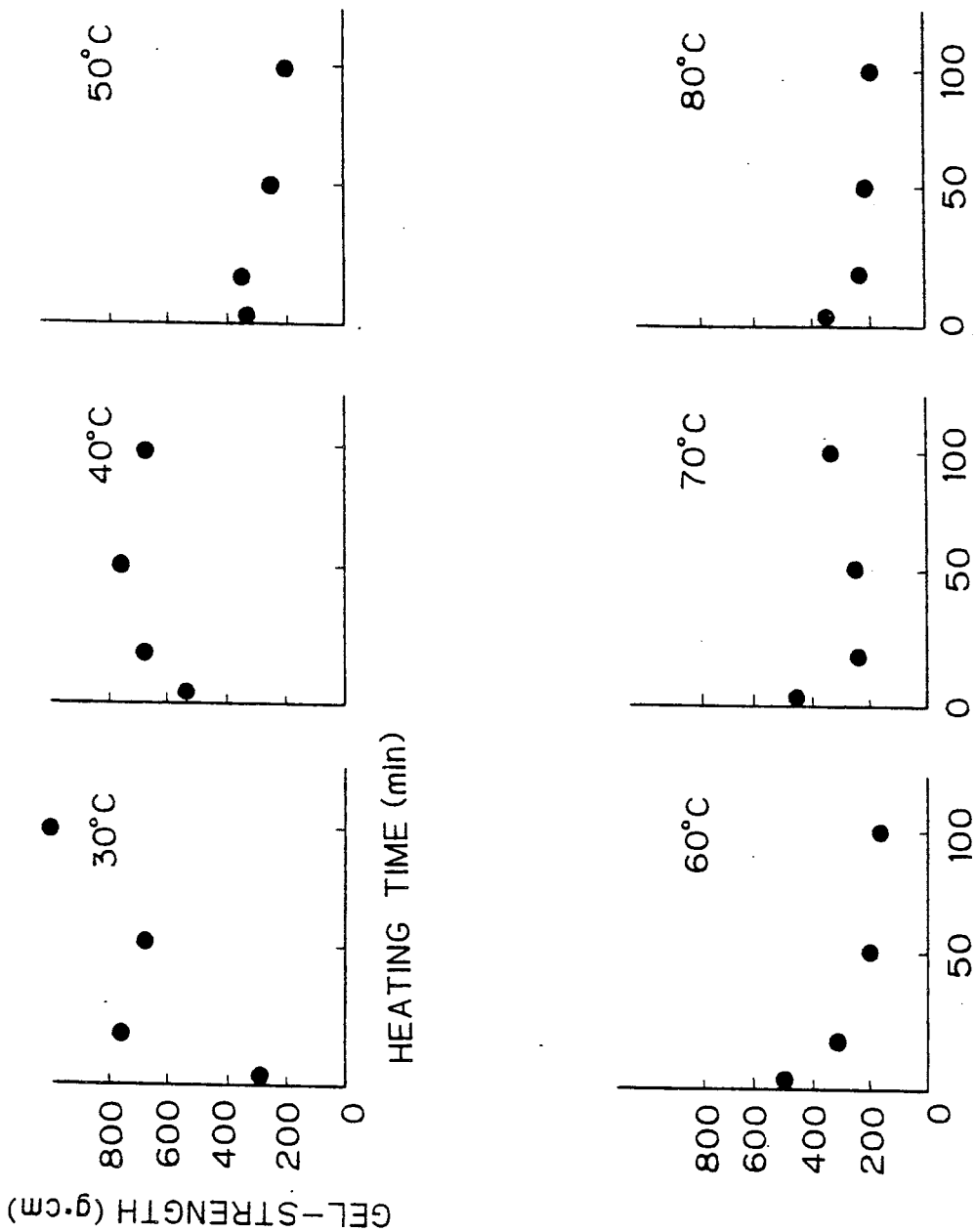

SURIMI

This application is a continuation of now abandoned application, Ser. No. 07/686,943 filed on Apr. 18, 1991.

BACKGROUND OF THE INVENTION

1. Field of the Invention

The present invention relates to surimi, or a fish paste product that is chiefly composed of the meat of a freshwater fish.

2. Brief Description of the Prior Art

Fish paste products typified by kamaboko, hampen, chikuwa etc. are produced by the steps of processing raw fish to obtain fish meat, grinding the meat in the presence of sodium chloride and auxiliary materials to obtain a meat paste, shaping the fish meat paste and heating the same. The quality of the thus produced fish paste products is largely dependent on the raw fish used as the starting material. To take kamaboko as an example, one of the features that characterize its palatability is "ashi" (gel-strength), which pertains to the elasticity of kamaboko being cut into pieces, as well as to the crispness that is sensed when it is bitten. The stronger the "ashi", the higher the quality of kamaboko. The strength of "ashi" varies with the kinds of raw fish used as the starting materials; croaker, black marlin, lizard fish and sillaginoid produce kamaboko of strong "ashi", whereas Pacific saury, horse mackerel and other fishes having red fish meats only produce kamaboko of weak "ashi". Strong "ashi" indicates the presence of a desired gel structure in the products. A gel structure is a network structure that is formed by actomysin released from the muscle proteins. In addition to "ashi", the whiteness of the product is also appealing to consumers.

Conventionally, fish paste products have been produced directly from fresh raw fish such as croaker, sharp-toothed eel and lizard fish. However, in the face of declining catches by coastal fisheries in Japan, most of the fish paste products available today are produced from frozen surimi. While many fishes, including walleye pollack, croaker, thread bream, alfonsin, horse mackerel and sharp-toothed eel, are frozen to be used as starting materials for producing frozen surimi, walleye pollack is most common for the following two reasons: the muscle of walleye pollack has higher gel strength than other pelagic fishes and hence is suitable for producing kamaboko of strong "ashi"; secondly, the meat of walleye pollack has such a high degree of whiteness that it is also suitable for producing kamaboko of white color.

However, the catch of walleye pollack is dwindling these days and it has become difficult to insure the necessary amount of walleye pollack to produce surimi. As the amount of walleye pollack for surimi decreases, the voyage of a fishing fleet is inevitably extended, often causing an increase in the production costs. Under these circumstances, it has been desired to develop surimi that can be produced from kinds of fish other than walleye pollack.

SUMMARY OF THE INVENTION

The present inventor conducted intensive studies with a view to solving the aforementioned problems of the prior art. As a result, the present inventor found that when freshwater fish were used in place of walleye pollack, surimi having comparable elasticity to walleye pollack could be produced by a simplified process at a lower cost.

The present invention has been accomplished on the basis of this finding and it attains the above-stated object by providing surimi that is chiefly composed of the meat of a freshwater fish.

BRIEF DESCRIPTION OF THE DRAWINGS

FIG. 1 is a set of graphs showing the profiles of thermal gelling reaction on the meat paste of catfish; and FIG. 2 is a set of graphs showing the profiles of thermal gelling reaction on the meat paste of walleye pollack.

DETAILED DESCRIPTION OF THE PRESENT INVENTION

The surimi of the present invention is described below in detail. The surimi of the present invention can be produced from any kinds of freshwater fish including carp, Crucian carp and catfish, among which catfish is particularly preferred for the following reasons.

(1) The meat paste of catfish is by far more heat-stable than that of walleye pollack. Surimi is generally produced by the following steps: Rinsing minced fish meat fully with water; dehydrating the rinsed meat; adding saccharides and condensed phosphates to the dehydrated meat to inhibit protein denaturation; grinding the mixture; and storing the surimi in a frozen state. In order to produce fish paste products, the frozen surimi is furthermore ground in the presence of sodium chloride and auxiliary materials to form a paste, which is then allowed to set ("suwari") and is then heated to develop "ashi" or gel-strength. To insure products having a satisfactory gel structure, surimi must be held at low temperatures prior to further grinding in the presence of sodium chloride and auxiliary materials. Therefore, the fish to be used as a starting material desirably has high heat-stability and will not readily set ("suwari"). For the high heat-stability of the meat paste of catfish, see the example to be described later in this specification.

Mg-ATPase in muscle proteins (actomyosin) has a maximum activity at 25° C. for walleye pollack and at 35° C. for catfish, which indicates the high heat-stability of catfish.

(2) The meat paste of catfish is highly elastic. The heating step in the production of fish paste products is performed in order to form a highly elastic gel. When the fish meat paste obtained by grinding frozen surimi in the presence of sodium chloride and auxiliary materials is allowed to "suwari" and is subsequently heated, a fish paste product having strong "ashi" is obtained. Therefore, it is desirable to select a kind of fish that will provide fish meat paste having high gel-strength at elevated temperatures. For the gel-strength of the meat paste of catfish (after heating at 70° or 80° C. for 20 minutes), see the example described later in this specification.

(3) Surimi with low moisture content can be obtained more easily from catfish than other kinds of fish. In order to obtain surimi, dehydration is performed following rinsing with water. Dehydration is more easily accomplished with catfish than with walleye pollack. To obtain the surimi of walleye pollack with a moisture content of 77%, a large dehydrator (i.e., screw press) must be employed but a simple centrifuge (decanter) will suffice to obtain the surimi of catfish having a moisture content of 75–76%. This contributes to simplicity in the overall process of production.

(4) The meat of catfish has a high degree of whiteness. The meat of catfish is whiter than the meat of pelagic fishes such as horse mackerel, sardine and flying fish and its whiteness is comparable to that of walleye pollack. Thus, catfish is suitable for producing fish paste products that are white in color.

Using the meat of catfish having the characteristics described above, surimi can be produced in the usual manner. Stated more specifically, the starting fish (catfish) is preconditioned by removing the head, the internal organs and bones; the remainder is minced with a drum with perforations; the minced meat is submerged in a water tank and agitated with several volumes of water for rinsing involving several changes of water; the rinsed meat is then dehydrated and strained with a strainer; saccharides, condensed phosphates and other auxiliary materials are added and kneaded together with the strained meat; the resulting surimi is packaged and stored frozen.

EXAMPLE

Catfish (3 kg) was stripped of the head and the internal organs and washed with water. Minced meat (1.2 kg) was obtained by means of a drum with perforations and submerged in a water tank where it was agitated together with 8 volumes of water for rinsing involving two changes of water. The rinsed meat was dehydrated by centrifugation. The dehydrated meat was strained with a strainer. In order to inhibit protein denaturation, saccharides and condensed phosphates were added and kneaded with the strained meat in the usual manner to obtain 1 kg of surimi.

The thus obtained surimi from catfish was further ground in the presence of 2.5% NaCl to prepare paste, which was subjected to the following tests.

Heat Stability Test

A test was conducted to compare the heat-stability of the paste made from catfish with that of the paste prepared by further grinding the prior art surimi from walleye pollack in the presence of 2.5% NaCl. FIGS. 1 and 2 are graphs showing the profiles of thermal gelling reaction conducted at 30°-80° C. for 0-100 minutes on the catfish and walleye pollack pastes, respectively. As is clear from those figures, the gel-strength of the meat paste of catfish did not rise until after a temperature of about 50° C. was reached but the gel-strength of the meat paste of walleye pollack already started to rise at 30°-40° C. In other words, the meat of catfish is more heat-stable than the meat of walleye pollack. Therefore, catfish used as a staring material for fish paste products permits easier process control than walleye pollack.

The conventional surimi of walleye pollack, in particular the surimi prepared on-shore, has 3-4% saccharides and ca. 0.2% condensed phosphates added as agents to inhibit freezing denaturation. In this respect, too, the meat of catfish is superior to that of walleye pollack since its high heat-stability reduces the chance of freezing denaturation, with the result that the amount of denaturation inhibitors is reduced to about one half the amount required in the conventional surimi of walleye pollack.

Heating Characteristic Test

Each of the meat pastes of catfish and walleye pollack was heated at 70° C. or 80° C. for 20 minutes and subjected to a plunger push-in test under a load of 1 kg in order to measure the gel-strength of each meat paste. The results are shown in Table 1 below.

TABLE 1

| | Breaking load (height) (g) | Breaking strain (cm) | Gel-strength (g · cm) | Average |
|---|---|---|---|---|
| Walleye pollack (70° C. × 20 min) | 188 | 2.10 | 394.80 | 392.76 |
| | 176 | 2.22 | 390.72 | |
| Walleye pollack (80° C. × 20 min) | 168 | 1.68 | 282.24 | 304.80 |
| | 176 | 1.86 | 327.36 | |
| Catfish (70° C. × 20 min) | 200 | 2.82 | 564.00 | 546.60 |
| | 196 | 2.70 | 529.20 | |
| Catfish (80° C. × 20 min) | 164 | 2.40 | 393.60 | 365.52 |
| | 148 | 2.28 | 337.44 | |

As is clear from Table 1, the meat paste of catfish exhibited a higher gel-strength than the meat paste of walleye pollack whether it was heated at 70° C. or 80° C. It is therefore concluded that a fish paste product having strong "ashi" can be obtained by using catfish as a starting material.

As described on the foregoing pages, the surimi of freshwater fish has a gel-strength and whiteness comparable to that of walleye pollack. Further, the desired surimi can be obtained without going out to the sea as in the previous case of catching walleye pollack by a large fishing fleet, and this contributes to the production of surimi in a simpler and less costly manner.

I claim:

1. Surimi which consists essentially of the meat of catfish produced through a surimi manufacturing process comprising the steps of mincing the meat of catfish after filleting, rinsing the minced meat, dehydrating the rinsed meat, adding condensed phosphates to the meat and mixing them together, grinding the mixture, and if desired, freezing the mixture.

2. Surimi according to claim 1 which is frozen.

* * * * *